United States Patent [19]

Contin

[11] 4,362,658
[45] Dec. 7, 1982

[54] PROCESS FOR PREPARING A FLAME RETARDANT COMPOSITION FROM SODIUM ANTIMONATE AND COMPOSITION THEREBY PRODUCED

[75] Inventor: Fulvio Contin, Wilrijk, Belgium

[73] Assignee: Metallurgie Hoboken-Overpelt, Brussels, Belgium

[21] Appl. No.: 184,009

[22] Filed: Sep. 4, 1980

[30] Foreign Application Priority Data

Sep. 5, 1979 [LU] Luxembourg ................. 81649

[51] Int. Cl.$^3$ .................. C09K 3/28; C08F 6/00
[52] U.S. Cl. ............................. 252/609; 106/18.25; 106/18.28; 252/601; 252/602; 252/610; 423/617; 524/410
[58] Field of Search ............... 423/617; 252/609, 601, 252/602, 610; 106/18.25, 18.28; 260/42.49, 45.75 B

[56] References Cited

U.S. PATENT DOCUMENTS

| | | | |
|---|---|---|---|
| 3,431,086 | 3/1969 | Baetsle et al. | 423/617 |
| 3,560,441 | 2/1971 | Schwarcz et al. | 252/609 |
| 3,723,139 | 3/1973 | Larkin et al. | 252/602 |
| 3,816,367 | 6/1974 | Larkin et al. | 252/609 |
| 3,860,523 | 1/1975 | Petrow | 252/609 |
| 3,892,667 | 7/1975 | Touval | 252/609 |
| 3,897,389 | 7/1975 | Touval | 252/609 |
| 4,110,247 | 8/1978 | Gower et al. | 423/617 |

FOREIGN PATENT DOCUMENTS 786245  5/1968  Canada ..................... 423/617

*Primary Examiner*—Teddy S. Gron
*Attorney, Agent, or Firm*—Fred Philpitt

[57] ABSTRACT

Sodium antimonate is made to react with an acid solution so as to transform a fraction of the sodium antimonate into pentavalent antimony oxide, thus producing a mixture of pentavalent antimony oxide and sodium antimonate, the so produced mixture is separated from the solution and that mixture is dried and pulverized. The so produced powder presents good flame retardant properties.

7 Claims, No Drawings

PROCESS FOR PREPARING A FLAME RETARDANT COMPOSITION FROM SODIUM ANTIMONATE AND COMPOSITION THEREBY PRODUCED

The present invention relates to a process for preparing a flame retardant composition from sodium antimonate.

Such a process is known through the U.S. Pat. Nos. 3,892,667 and 3,897,389. According to that known process, sodium antimonate is ground so as to yield a finely divided antimonate being the flame retardant composition.

That known process presents the drawback that it hardly lends itself to the treatment of antimonates obtained at high temperature such as the antimonate obtained as a by-product at the alkaline refining of molten lead according to the Harris process, such antimonates being very resistant to crushing and, thus, hard to grind.

The fact that the flame retardant composition obtained by that known process essentially consists of sodium antimonate and is free from antimony oxide, is also disadvantageous, since a mixture of sodium antimonate and antimony oxide presents better flame retardant properties than sodium antimonate alone (see U.S. Pat. No. 3,723,139).

The aim of the present invention is to provide a process that avoids the above drawbacks.

According to the invention, the sodium antimonate is made to react with an acid solution so as to transform a fraction of the sodium antimonate into pentavalent antimony oxide, thus producing a mixture of pentavalent antimony oxide and sodium antimonate, the so produced mixture is separated from the solution and that mixture is dried and pulverized.

Any sodium antimonate, produced either at high temperature or by a wet process, can be used as starting antimonate.

Any acid solution that reacts with sodium antimonate to form antimony oxide, may be used. For economical reasons use is preferably made of an aqueous solution of hydrochloric acid and/or sulphuric acid and/or nitric acid, with a concentration advantageously comprised between 1 and 5 N.

As to the antimonate:acid ratio to be used, it's obvious that that ratio depends upon the fraction of the sodium antimonate which is wished to be transformed into oxide. Advantageously, the antimonate is made to react with an amount of acid ranging from 1 to 1.35 times the stoechiometric amount so as to transform at least 60 and, preferably, at least 95% of the antimonate into oxide.

The reaction may be carried out at any temperature between the freezing point and the boiling point of the acid solution, but it is, preferably, carried out at the ambient temperature (18 to 25° C.), because, on the one hand, it is advantageous to transform the antimonate as much as possible into oxide, and, on the other hand, it has been found that with the same antimonate:acid ratio and with the same reaction time the rate of transformation of the antimonate into oxide, is much higher at the ambient temperature that at high temperature.

As to the reaction time, this should preferably be sufficient in order that the reaction may reach the equilibrium. A time of 1 to 3 hours has been found to be satisfactory.

The reaction is advantageously carried out by putting the sodium antimonate in suspension in the acid solution. The sodium antimonate content of the suspension is, preferably, higher than 200 g/l; otherwise, the working expenses of the process become too high. That content is, preferably, lower than 900 g/l, when use is made of a sulphuric acid solution, and lower than 750 g/l, when use is made of a hydrochloric or nitric acid solution, because otherwise the suspension becomes muddy.

The mixture of antimony oxide and antimonate resulting from that reaction in suspension is then separated from the solution, for example by filtration, and washed first with a diluted solution of a mineral acid, preferably of 1 to 4 N, and then with enough water to eliminate the acid. When washing directly with water, the sodium content of the product increases substantially.

The drying and pulverizing of the washed mixture can be carried out simultaneously. So, the treatment of the washed mixture in a spray-dryer directly yields a powder that passes substantially completely through the sieve of 325 mesh. It is to be noted that the grain size of a powder, that has passed through the sieve of 325 mesh, is lower than 44 $\mu$m.

The drying and pulverizing of the washed mixture can also be carried out consecutively. So, the washed mixture can first be dried, for example in a drying-cupboard, and then the dried mixture can be broken up, for example in a hammer mill; this way also gives a powder that passes substantially completely through the sieve of 325 mesh. If one wishes to obtain a finer powder, the dried mixture is treated in a fluid energy mill, thus producing a powder with a very narrow grain size spectrum (0 to 2 $\mu$m) and with a mean grain size of about 1 $\mu$m.

It's obvious that, when pulverizing in an apparatus that isn't auto-classifying, such as the spray-dryer or the hammer mill, it's very useful to sieve the pulverized product. In that case, the Applicant recommends to use a sieve of 325 mesh, because, on the one hand, as already said before, it's very easy to get by the process of the present invention a product that passes substantially completely that sieve, and, on the other hand, it's generally admitted that the flame retardant properties of a flame retardant product improve with the fineness of that product. However, that recommendation doesn't imply that using a less fine sieve, of for example 100 mesh, in the process of the present invention would yield a product of unacceptable quality.

When the starting antimonate contains colouring impurities such as selenium and tellurium, it's useful to add to the suspension an oxidizing agent, preferably hydrogen peroxide, in a sufficient amount to bring those impurities into solution. Very often, it's enough to add about 5 ml of $H_2O_2$ at 30–35% per kg of antimony.

The invention also relates to the flame retardant compositions produced by the process of the invention as well as to the products that are made flameproof by addition of those compositions.

The following examples will make better understand the process of the invention and its advantages. Those examples also illustrate flame retardant compositions made by that process as well as products that are made flameproof by addition of those compositions.

In all those examples, the starting material is a wet sodium antimonate obtained as a by-product in a plant for lead refining according to the Harris process.

That wet antimonate (10 to 12% by weight of water) contains in the dry state, in % by weight: 48.8 Sb, 9.32 Na and 21.88 crystallizing $H_2O$.

EXAMPLE 1

This example relates to the preparation of a flame retardant composition from the above starting material (Harris antimonate) by the above mentioned prior art process that consists in grinding the antimonate so as to get a finely divided antimonate.

The starting material is first dried and then calcined at 280° C. for four hours in order to eliminate the major part of its crystallizing water.

The calcined antimonate, which contains 57.74% by weight of antimony, is then pulverized in a fluid energy mill of the "MC-200 KX" type of the company "Micro Grinding Ltd." of Switzerland. This autoclassifying mill is operated with an air pressure of 6.5 bar and delivers 5 kg of powder an hour (mean grain size: 1 μm).

The flame retardant properties of this powder are evaluated by the standardized method of the oxygen index determination.

To a plastic material made up of 100 parts of PVC (labelled "Solvic 271 GA" of the company Solvay), 36 parts of dioctylphtalate, 5 parts of tribasic lead sulphate and 1 part of calcium stearate, 5.8% by weight of the fine antimonate powder are added. The so produced material presents an oxygen index of 30.3.

When replacing in that material the 5.8% of fine antimonate by 4% of commercial flame retardant $Sb_2O_3$ (labelled "Blue Star P CMC" of the company "Compagnie Chimique et Métallurgique Campine" of Belgium; 83.53% of Sb) thus producing the same Sb content, the oxygen index becomes 32.3.

When adding 11.6% of the fine antimonate to a plastic material made up of 89 parts of polyester (labelled "S.333" of BASF), 2 parts of butanox and 1 part of cobalt octoate, a material is produced presenting an oxygen index of 26.1 When replacing in that material the 11.6% of fine antimonate powder by 8% of the above mentioned commercial flame retardant $Sb_2O_3$, the oxygen index becomes 27.4

EXAMPLE 2

This example relates to the preparation of a flame retardant composition from the above starting material (Harris antimonate) by the process of the present invention.

8 kg of wet antimonate are put in suspension in a solution made up of 4 l of water, 1.36 l of HCl 12 N and 0.68 l of $H_2SO_4$; 0.02 l of $H_2O_2$ at 30% are added to that suspension. After 3 hours of reaction at the ambient temperature (18° C.), the suspension is filtered. The filtration cake is washed with 13.4 l of an aqueous solution, containing 0.05 l of $H_2SO_4$ 36 N and 0.1 l of HCl 12 N per liter, and then with 22.3 l of water. The washed cake is dried in a drying-cupboard, yielding 5.2 kg of dry product containing in % by weight: 63.81 Sb, 0.18 Cl and 0.08 Na. That product contains 0.67% by weight of $NaSbO_3$ and 99.33% by weight of $Sb_2O_5$ (calculated figures).

That product is pulverized in the fluid energy mill of example 1, at an air pressure of 6.5 bar. The apparatus delivers 30 kg of powder an hour.

When adding 5.2% by weight of that powder to the PVC-based plastic material of example 1, thus producing a PVC-based material having the same Sb content as those of example 1, a material is obtained presenting an oxygen index of 32.1

When adding 10.5% by weight of that powder to the polyester-based plastic material of example 1, thus producing a polyester-based material having the same Sb content as those of example 1, a material is obtained presenting an oxygen index of 28.5.

When comparing the date of examples 1 and 2, it is seen that:
(1) a mixture of pentavalent antimony oxide and sodium antimonate, produced by acid treatment of sodium antimonate, can be much easier pulverized than the sodium antimonate from which it originates,
(2) at the same fineness, that mixture presents better flame retardant properties than the sodium antimonate,
(3) the flame retardant properties of the product of example 2 are comparable to those of commercial flame retardant $Sb_2O_3$ as far as the fireproofing of PVC-based materials is concerned, and better than those of that $Sb_2O_3$ as far as the fireproofing of polyester-based materials is concerned.

EXAMPLE 3

This example relates, like example 2, to the preparation of a flame retardant composition from the above starting material (Harris antimonate) by the process of the present invention.

7.15 kg of wet antimonate are put in suspension in a solution made up of 4.3 l of water and 2.86 l of HCl 12 N. The suspension is stirred for 3 hours at the ambient temperature (18° C.). The suspension is then filtered and the filtration cake is washed with 12.45 l of an aqueous solution, containing 0.16 l of HCl 12 N per liter, and then with 20.9 l of water. The washed cake is dried in a drying-cupboard, yielding 4.647 kg of dry product containing in % by weight: 61.74 Sb, 0.61 Na and 0.17 HCl. That product contains 5.24% by weight of $NaSbO_3$ and 94.76% by weight of $Sb_2O_5$ (calculated figures). After desintegration of the dried product in a hammer mill, it is passed through a sieve of 325 mesh. The fraction that has passed the sieve (99.7%) is used for fireproofing the PVC-based plastic material of examples 1 and 2. To that plastic material, 5.4% by weight is added of the fraction, that has passed the 325 mesh sieve, thus producing a PVC-based plastic material having the same Sb content as those of examples 1 and 2. That plastic material presents an oxygen index of 31.6. Although being 0.5 unit lower than that one obtained in example 2, this index, obtained with a rather coarse flame retardant composition, is still 1.3 units higher than the one obtained in example 1 with the very fine antimonate.

EXAMPLE 4

This example also relates to the preparation of a flame retardant composition from the above starting material (Harris antimonate) by the process of the present invention.

9 kg of wet antimonate are put in suspension in a solution made up of 5 l of water and 1.17 l of $H_2SO_4$ 36 N; 0.023 l of $H_2O_2$ at 30% are added to that suspension and the suspension is stirred for 1 hour at 80° C. Then the suspension is filtered and the filtration cake is washed with 11.6 l of an aqueous solution, containing 0.06 l of $H_2SO_4$ 36 N per liter, and then with 15.4 l of water. The washed cake is dried in a drying-cupboard, yielding 5.381 kg of dry product containing in % by weight: 61.78 Sb, 3.61 Na and 0.02 Cl. That product contains 31% by weight of NaSbO$_3$ and 69% by weight of Sb$_2$O$_5$ (calculated figures).

That dry product is pulverized in the fluid energy mill of example 1, at an air pressure of 6.5 bar. The mill delivers 30 kg of powder an hour.

When adding 5.4% by weight of that powder to the PVC-based plastic material of example 1, thus producing a PVC-based materials having the same Sb content as those of example 1, a material is obtained that presents an oxygen index of 31.7.

When comparing the data of examples 2 and 4, it is seen that the high sodium (NaSbO$_3$) content of the product obtained in example 4 seems to have an unfavourable influence upon the flame retardant properties of this product. However, the oxygen index obtained with this product with high sodium content is still 1.4 units higher than that one obtained in example 1 with very fine antimonate.

EXAMPLE 5

In this example, two comparative test are described which illustrate the influence of the reaction temperature on the sodium content of the product obtained by the process of the invention.

In a first test, 0.85 kg of wet antimonate is put in suspension in a solution made up of 0.5 l of water and 0.34 l of HCl12 N. The suspension is stirred for 1 hour at 80° C. The suspension is then filtered and the filtration cake is washed with 0.54 l of HCl1.5 N and then with 0.9 l of water. The cake is dried in a drying-cupboard, yielding 0.593 kg of dry product containing in % by weight: 60 Sb, 4.43 Na and 1.03 Cl. That product contains 39.1% by weight of NaSbO$_3$ and 60.9% by weight of Sb$_2$O$_5$ (calculated figures).

In the second test, one proceeds in the same way, but the reaction is carried out at the ambient temperature. One obtains 0.57 kg of dry product containing in % by weight: 64.9 Sb, 0.7 Na and 0.27 Cl. That product contains 5.7% by weight of NaSbO$_3$ and 94.3% by weight of Sb$_2$O$_5$ (calculated figures).

Thus, in the process of the invention, it's useful to operate at the ambient temperature in order to get a product of low sodium content.

EXAMPLE 6

In this example, two comparative tests are described illustrating the influence of the washing conditions of the filtration cake on the sodium content of the product obtained by the process of the invention.

0.85 kg of wet antimonate is put in suspension in a solution made up of 0.5 l of water and 0.34 l of HCl12 N. The suspension is stirred for 4 hours at the ambient temperature (19° C.). The suspension is then divided into two nearly equal parts.

The first part of the suspension is filtered and the filtration cake is washed with 1.27 l of water. The cake is dried in a drying-cupboard, yielding 0.252 kg of dry product containing in % by weight: 63 Sb, 1.92 Na and 0.3 Cl. That product contains 16.1% by weight of NaSbO$_3$ and 83.9% by weight of Sb$_2$O$_5$ (calculated figures).

The other part of the suspension is filtered and the filtration cake is first washed with 0.45 l of an aqueous solution, containing 0.16 l of HCl12 N per liter, and then with 1.13 l of water. The cake is dried in a drying-cupboard, yielding 0.294 kg of dry product containing in % by weight: 63.48 Sb, 0.43 Na and 0.18 Cl. That product contains 3.6% by weight of NaSbO$_3$ and 96.4% by weight of Sb$_2$O$_5$ (calculated figures).

Thus, in the process of the invention it's useful to wash the filtration cake first with an acid solution in order to get a product of low sodium content.

It is to be noted that in the above described examples 2 to 6, more than 96% of the antimony present in the starting material have been found in the end product, which means that antimony losses are very low in the process of the invention.

It is also to be stressed that the Harris antimonate used as a starting material in those examples, is an antimonate produced at high temperature and, consequently, not very reactive. It's thus obvious that the process of the present invention allows treating any sodium antimonate, produced either at high temperature or by a wet process.

I claim:

1. A process for preparing a flame retardant composition from sodium antimonate, comprising
   (a) contacting sodium antimonate, resulting from the alkaline refining of molten antimony-bearing lead, with such an amount of a 1–5 N aqueous solution of at least one acid selected from the group consisting of hydrochloric, sulfuric, and nitric acid that the amount of acid ranges from 1 to 1.35 times the stoichiometric amount, between the freezing point and the boiling point of the acid solution and for at least 1 hour so as to dissolve at least 60% of the sodium contained in the antimonate, thereby leaving most of the antimony contained in the antimonate in a solid phase;
   (b) separating the solid phase from the solution; and
   (c) drying and pulverizing the solid phase.

2. The process of claim 1 wherein at least 95% of the sodium contained in the antimonate is dissolved.

3. The process of claim 1 wherein the sodium antimonate is put in suspension in the acid solution and the sodium antimonate content of the suspension ranges from 200 to 900 g/l.

4. The process of claim 1 wherein step (a) is carried out at the ambient temperature.

5. The process of claim 1 wherein the solid phase resulting from step (b) is first washed with a diluted acid solution and then with water.

6. The process of claim 1 wherein the sodium antimonate contains coloring impurities and an oxidizing agent is added to the acid solution in a sufficient amount to oxidize those impurities.

7. The process of claim 6 wherein hydrogen peroxide is used as the oxidizing agent.

* * * * *